(12) United States Patent
Katsura

(10) Patent No.: US 10,291,809 B2
(45) Date of Patent: May 14, 2019

(54) INFORMATION PROCESSING APPARATUS THAT EXECUTES IP FACSIMILE COMMUNICATION AND A JOB OTHER THAN THE IP FACSIMILE COMMUNICATION, AND INFORMATION PROCESSING METHOD OF EXECUTING IP FACSIMILE COMMUNICATION AND A JOB OTHER THAN THE IP FACSIMILE COMMUNICATION

(71) Applicant: KYOCERA DOCUMENT SOLUTIONS INC., Osaka (JP)

(72) Inventor: Kenichi Katsura, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/577,568

(22) PCT Filed: Apr. 14, 2017

(86) PCT No.: PCT/JP2017/015288
§ 371 (c)(1),
(2) Date: Nov. 28, 2017

(87) PCT Pub. No.: WO2018/003240
PCT Pub. Date: Jan. 4, 2018

(65) Prior Publication Data
US 2018/0359373 A1    Dec. 13, 2018

(30) Foreign Application Priority Data
Jul. 1, 2016    (JP) .................................. 2016-131391

(51) Int. Cl.
*G06F 3/12*    (2006.01)
*H04N 1/00*    (2006.01)
(Continued)

(52) U.S. Cl.
CPC ........... *H04N 1/0096* (2013.01); *G06F 3/122* (2013.01); *G06F 3/1234* (2013.01);
(Continued)

(58) Field of Classification Search
CPC ............... H04N 1/0096; H04N 1/0092; H04N 1/00915; H04N 1/00082; H04N 1/2376; H04N 1/32782; G06F 9/4881
(Continued)

(56) References Cited

U.S. PATENT DOCUMENTS

2007/0229910 A1* 10/2007 Ulybin .............. H04L 29/06027
358/405
2008/0117477 A1* 5/2008 Fujise ................ H04N 1/00214
358/468

FOREIGN PATENT DOCUMENTS

JP    2008-011352 A    1/2008
JP    2015-170862 A    9/2015

* cited by examiner

*Primary Examiner* — Jamares Q Washington
(74) *Attorney, Agent, or Firm* — Li & Cai Intellectual Property (USA) Office

(57) ABSTRACT

An information processing apparatus (10) includes a processor capable of executing IP facsimile communication and a job other than the IP facsimile communication, a facsimile tone signal being transmitted/received as audio data in the IP facsimile communication; a storage (12) that stores a first or second level, which represents a mode for executing the IP facsimile communication; and a control unit (11) that determines whether the first or second level is stored in the storage, respectively selects a first mode and a second mode when determining that the first level and the second level are stored in the storage, and when receiving an execution instruction of the IP facsimile communication in the first mode and the second mode, respectively causes the processor to stop an uncompleted job and then preferentially (Continued)

execute the IP facsimile communication, and to execute an uncompleted job and the IP facsimile communication in parallel.

15 Claims, 7 Drawing Sheets

(51) Int. Cl.
*G06F 9/48* (2006.01)
*H04M 11/00* (2006.01)
*H04N 1/32* (2006.01)
*H04N 1/327* (2006.01)

(52) U.S. Cl.
CPC .............. *G06F 3/1239* (2013.01); *G06F 9/48* (2013.01); *G06F 9/4881* (2013.01); *H04M 11/00* (2013.01); *H04N 1/00* (2013.01); *H04N 1/0022* (2013.01); *H04N 1/0092* (2013.01); *H04N 1/32* (2013.01); *H04N 1/32782* (2013.01)

(58) Field of Classification Search
USPC ............................... 358/1.15, 1.13, 405, 407
See application file for complete search history.

INFORMATION PROCESSING APPARATUS THAT EXECUTES IP FACSIMILE COMMUNICATION AND A JOB OTHER THAN THE IP FACSIMILE COMMUNICATION, AND INFORMATION PROCESSING METHOD OF EXECUTING IP FACSIMILE COMMUNICATION AND A JOB OTHER THAN THE IP FACSIMILE COMMUNICATION

BACKGROUND OF THE INVENTION

1. Field of the Invention

The present disclosure relates to an information processing apparatus and an information processing method that execute IP facsimile communication in which a facsimile tone signal is transmitted/received as audio data.

2. Description of Related Art

There is known a technology that executes IP facsimile communication in which a facsimile tone signal is transmitted/received as audio data (see, for example, Patent Literature 1 and Patent Literature 2).

CITATION LIST

Patent Literature

Patent Literature 1: Japanese Patent Application Laid-open No. 2015-170862
Patent Literature 2: Japanese Patent Application Laid-open No. 2008-011352

SUMMARY OF THE INVENTION

Technical Problem

In the technology that executes audio communication processing on a facsimile tone signal by software processing and transmits/receives the processed facsimile tone signal as audio data, it is desired to detect the facsimile tone signal in real time even in the state where the load of a processor (CPU) is high.

In view of the circumstances as described above, it is an object of the present disclosure to provide an information processing apparatus, a program, and an information processing method that can execute audio data processing of a facsimile tone signal in real time even in the state where the load of a processor is high.

Solution to Problem

An information processing apparatus according to an embodiment of the present disclosure includes:
a processor capable of executing IP facsimile communication and a job other than the IP facsimile communication, a facsimile tone signal being transmitted/received as audio data in the IP facsimile communication;
a storage that stores a first level or a second level, the first level or the second level representing a mode for the processor to execute the IP facsimile communication; and
a control unit that
determines whether the first level or the second level is stored in the storage, selects a first mode when determining that the first level is stored in the storage, and selects a second mode when determining that the second level is stored in the storage,
when receiving an execution instruction of the IP facsimile communication in the first mode, causes the processor to stop an uncompleted job and then preferentially execute the IP facsimile communication, and
when receiving an execution instruction of the IP facsimile communication in the second mode, causes the processor to execute an uncompleted job and the IP facsimile communication in parallel.

According to the present embodiment, the information processing apparatus selects the first mode (stops an uncompleted job and then preferentially executes IP facsimile communication) or the second mode (execute an uncompleted job and IP facsimile communication in parallel) depending on the first level or the second level. By storing the first level or the second level depending on the performance of the processor, it is possible to execute IP facsimile communication in an appropriate mode depending on the performance of the processor.

An information processing method according to an embodiment of the present disclosure is executed by an information processing apparatus including a processor capable of executing IP facsimile communication and a job other than the IP facsimile communication, a facsimile tone signal being transmitted/received as audio data in the IP facsimile communication, and a storage that stores a first level or a second level, the first level or the second level representing a mode for the processor to execute the IP facsimile communication, the method including:
determining whether the first level or the second level is stored in the storage, selecting a first mode when determining that the first level is stored in the storage, and selecting a second mode when determining that the second level is stored in the storage;
when receiving an execution instruction of the IP facsimile communication in the first mode, causing the processor to stop an uncompleted job and then preferentially execute the IP facsimile communication; and
when receiving an execution instruction of the IP facsimile communication in the second mode, causing the processor to execute an uncompleted job and the IP facsimile communication in parallel.

Advantageous Effects of Invention

According to the present disclosure, it is possible to execute audio data processing of a facsimile tone signal in real time even in the state where the load of a processor is high.

DETAILED DESCRIPTION OF THE PREFERRED EMBODIMENTS

Hereinafter, embodiments of the present disclosure will be described with reference to the drawings.

1. HARDWARE CONFIGURATION OF INFORMATION PROCESSING APPARATUS

Figure 1:
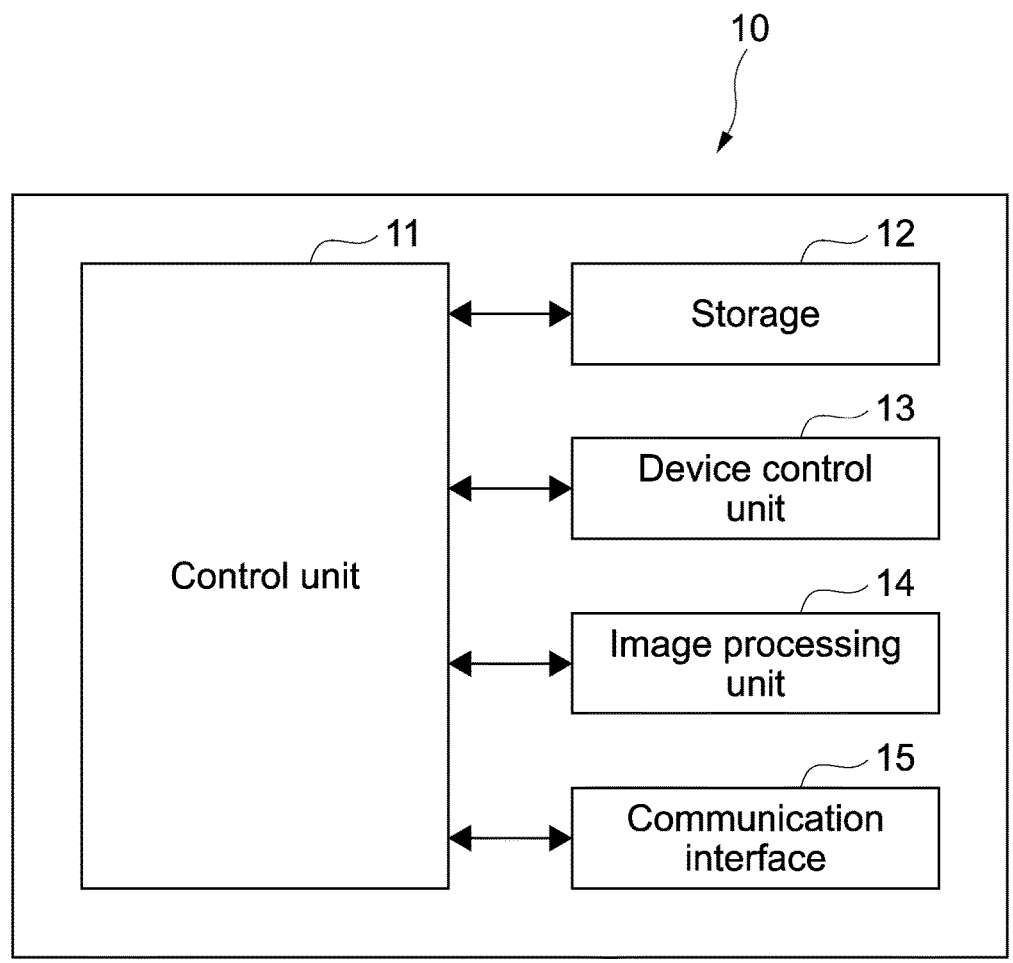
FIG. 1 is a block diagram showing a hardware configuration of an information processing apparatus.

FIG. 1 is a block diagram showing a hardware configuration of an information processing apparatus according to an embodiment of the present disclosure.

An information processing apparatus 10 is an image forming apparatus such as an MFP (Multifunction Peripheral). The information processing apparatus 10 includes a control unit 11. The control unit 11 includes a processor such as a CPU (Central Processing Unit), a RAM (Random Access Memory), a ROM (Read Only Memory), dedicated hardware circuits, and the like and performs overall operational control of the information processing apparatus 10. A computer program that causes the information processing apparatus 10 to operate as the respective functional units (to be described later) is recorded in a non-transitory computer readable recording medium such as a ROM. The CPU (processor) is configured to be capable of executing IP facsimile communication in which a facsimile tone signal is transmitted/received as audio data, and a job other than the IP facsimile communication.

The control unit 11 is connected to a storage 12, a device control unit 13, an image processing unit 14, a communication interface 15, and the like. The control unit 11 performs operational control of the above-mentioned respective units connected thereto and sends/receives signals and data to/from those units.

The storage 12 includes a ROM (Read Only Memory), a RAM, and a large-volume storage device such as an HDD (Hard Disk Drive). The ROM is an example of a non-transitory computer readable recording medium, and fixedly stores programs to be executed by the control unit 11, data, and the like. The programs stored in the ROM are loaded to the RAM.

The device control unit 13 is a scanner device that reads an image from a script.

The image processing unit 14 carries out image processing as necessary on image data of an image read by the device control unit 13. For example, the image processing unit 14 converts the image read by the device control unit 13 into a facsimile image.

The communication interface 15 is a communication interface for executing communication by a network protocol.

2. FUNCTIONAL CONFIGURATION OF INFORMATION PROCESSING APPARATUS

Figure 2:
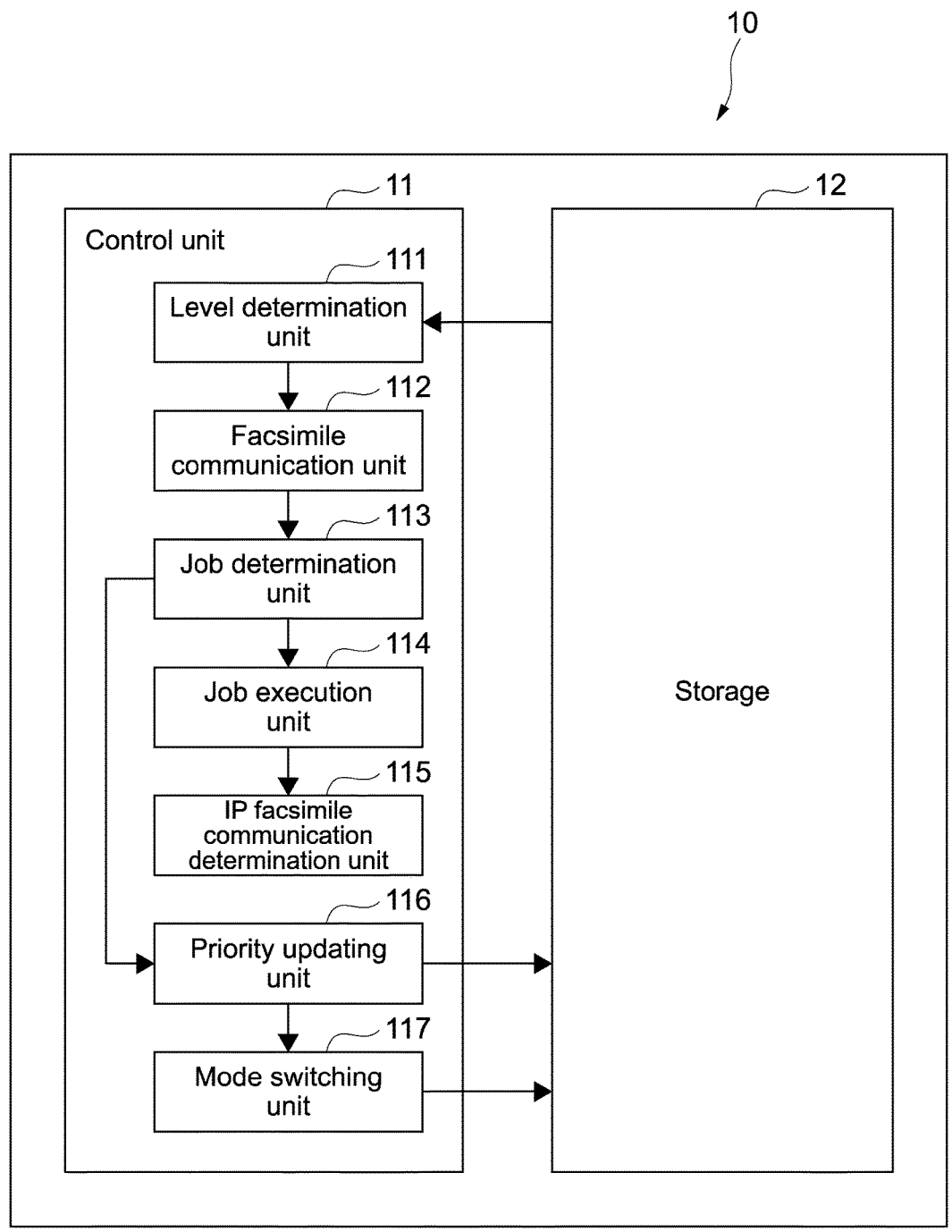
FIG. 2 is a block diagram showing a functional configuration of the information processing apparatus.

FIG. 2 is a block diagram showing a functional configuration of the information processing apparatus.

The information processing apparatus 10 functions as a level determination unit 111, a facsimile communication unit 112, a job determination unit 113, a job execution unit 114, an IP facsimile communication determination unit 115, a priority updating unit 116, and a mode switching unit 117 by loading an information processing program, which is stored in a ROM that is a non-transitory computer readable recording medium, in a RAM and executing the program.

The level determination unit 111 determines whether the level stored in the storage 12 is a first level or a second level, and causes the CPU to execute a first mode when determining that the level is the first level and a second mode when determining that the level is the second level.

The facsimile communication unit 112 executes IP facsimile communication in the first mode or the second mode. Details of the IP facsimile communication will be described later.

The job determination unit 113 determines whether or not there is an uncompleted job (job other than IP facsimile communication).

The job execution unit 114 executes a job (job other than IP facsimile communication).

The IP facsimile communication determination unit 115 determines whether or not an execution instruction of different IP facsimile communication has been received before an execution instruction of the present IP facsimile communication.

The priority updating unit 116 updates a variable of a priority of an IP facsimile thread, which is stored in the storage 12.

The mode switching unit 117 switches the second mode to the first mode by rewriting, from the second level to the first level, the level of the mode for the CPU to execute IP facsimile communication, which is stored in the storage 12.

The IP facsimile communication executed by the facsimile communication unit 112 will be described. The facsimile communication unit 112 includes an encoding/decoding unit, a modulation/demodulation unit, and an NCU (Network Control Unit) (all of which are not shown), and executes IP facsimile communication with another apparatus by a T.38 method or a deemed audio method. T.38 is a communication protocol of the ITU-T standard.

The facsimile communication unit 112 initially establishes a session with a gateway (not shown) according to SIP (Session Initiation Protocol). The facsimile communication unit 112 transmits/receives a digitized (RTP (Real-time Transport Protocol)-packetized) CNG signal or CED signal to/from another apparatus via this gateway. The used gateway is a gateway (manufactured by Cisco Systems, for example) that needs the above-mentioned operation for executing IP facsimile communication according to T.38 as analog G3 facsimile communication via a PSTN line in the case of the T.38 method, or a VoIP (Voice over Internet Protocol) gateway in the case of the deemed audio method.

Figure 3:
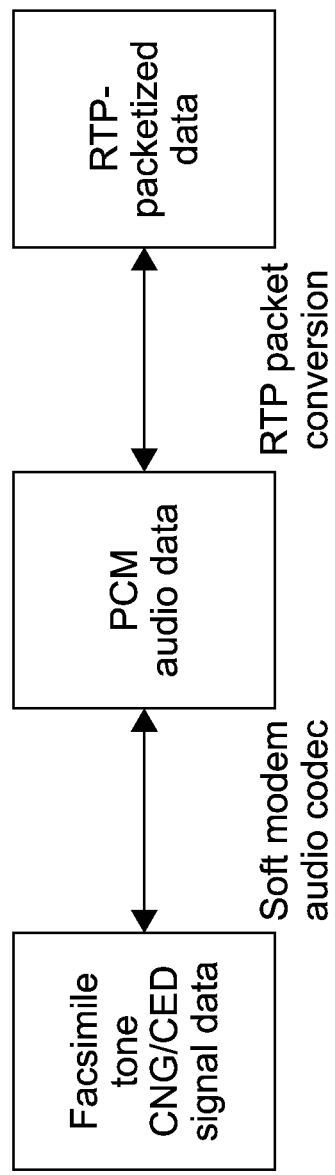
FIG. 3 is a diagram describing audio data processing executed by the information processing apparatus when transmitting/receiving a facsimile tone signal.

FIG. 3 is a diagram describing audio data processing executed by the information processing apparatus when transmitting/receiving a facsimile tone signal.

In the case of transmitting a CNG signal or a CED signal to another apparatus via a gateway, the facsimile communication unit 112 converts the signal into digital audio (PCM: Pulse Code Modulation) data, RTP-packetizes the converted data, and transmits the RTP-packetized data into another apparatus. Further, in the case of receiving RTP-packetized data from another apparatus via a gateway, the facsimile communication unit 112 detects a CNG signal or a CED signal by processing opposite to the above-mentioned conversion processing.

In the present embodiment, assumption is made that the facsimile communication unit 112 receives an execution instruction of IP facsimile communication in the case of receiving a connection request (INVITE message) or an ACK packet from another apparatus at the time of IP facsimile reception, for example. Further, assumption is made that the facsimile communication unit 112 receives an execution instruction of IP facsimile communication in the case of receiving an IP facsimile transmission instruction or transmitting a CNG signal at the time of IP facsimile transmission.

The above-mentioned operation is common to the T.38 method and the deemed audio method. After that, the facsimile communication unit 112 executes IP facsimile communication using an IFP (Internet Facsimile Protocol) packet in the case of using the T.38 method, and executes IP facsimile communication using an RTP packet in the case of using the deemed audio method.

3. OPERATION OF INFORMATION PROCESSING APPARATUS WHEN SELECTING MODE FOR EXECUTING IP FACSIMILE COMMUNICATION

Figure 4:
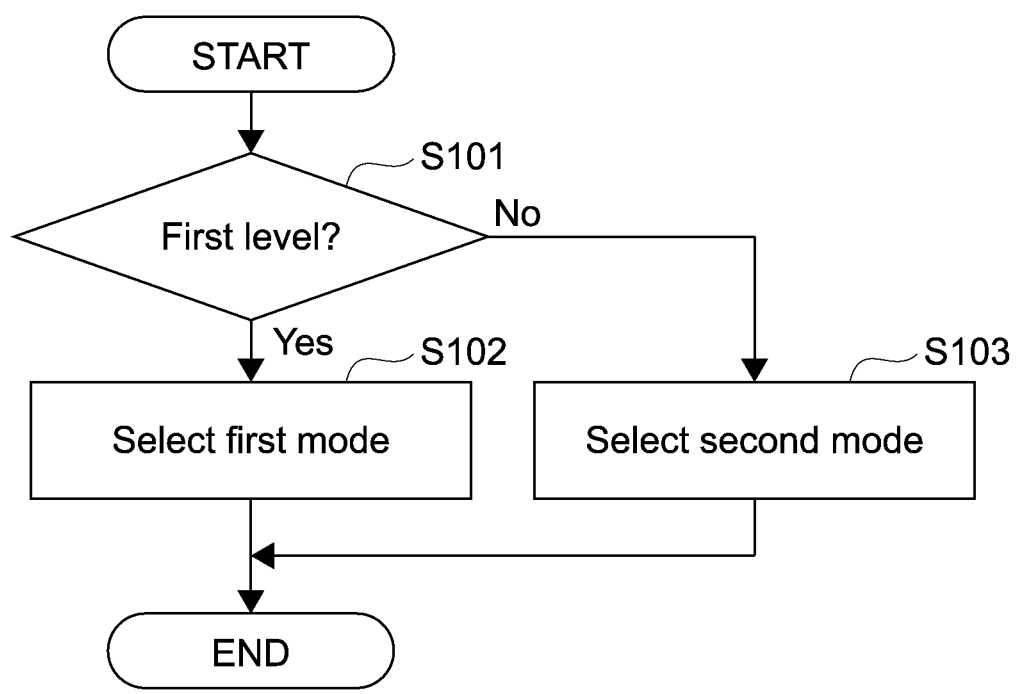
FIG. 4 is a flowchart showing an operation of the information processing apparatus when selecting a mode for executing IP facsimile communication.

FIG. 4 is a flowchart showing an operation of the information processing apparatus when selecting a mode for executing IP facsimile communication.

Assumption is made that the non-volatile memory or HDD of the storage 12 stores the first level or the second level that represents the mode for the CPU to execute IP facsimile communication. In the case where the storage 12 stores "the first level", the CPU executes IP facsimile communication in the first mode. In the case where the storage 12 stores "the second level", the CPU executes IP facsimile communication in the second mode. "The first mode" is a mode for the CPU to stop an uncompleted job (job other than IP facsimile communication, e.g., print job) and then preferentially execute IP facsimile communication. "The second mode" is a mode for the CPU to execute an uncompleted job (job other than IP facsimile communication, e.g., print job) and IP facsimile communication in parallel. Typically, the first level or the second level is registered in the storage 12 by an operator depending on the performance of the CPU, before shipment of the information processing apparatus 10. The first level is registered in an information processing apparatus on which a CPU with relatively low performance is mounted, and the second is registered in an information processing apparatus on which a CPU with relatively high performance is mounted.

The level determination unit 111 determines whether the level stored in the storage 12 is the first level or the second level (Step S101), selects the first mode (Step S102) in the case of determining that the level is the first level (Step S101: Yes), and selects the second mode (Step S103) in the case of determining that the level is the second level (Step S101: No).

4. OPERATION OF INFORMATION PROCESSING APPARATUS WHEN EXECUTING FIRST MODE

Figure 5:
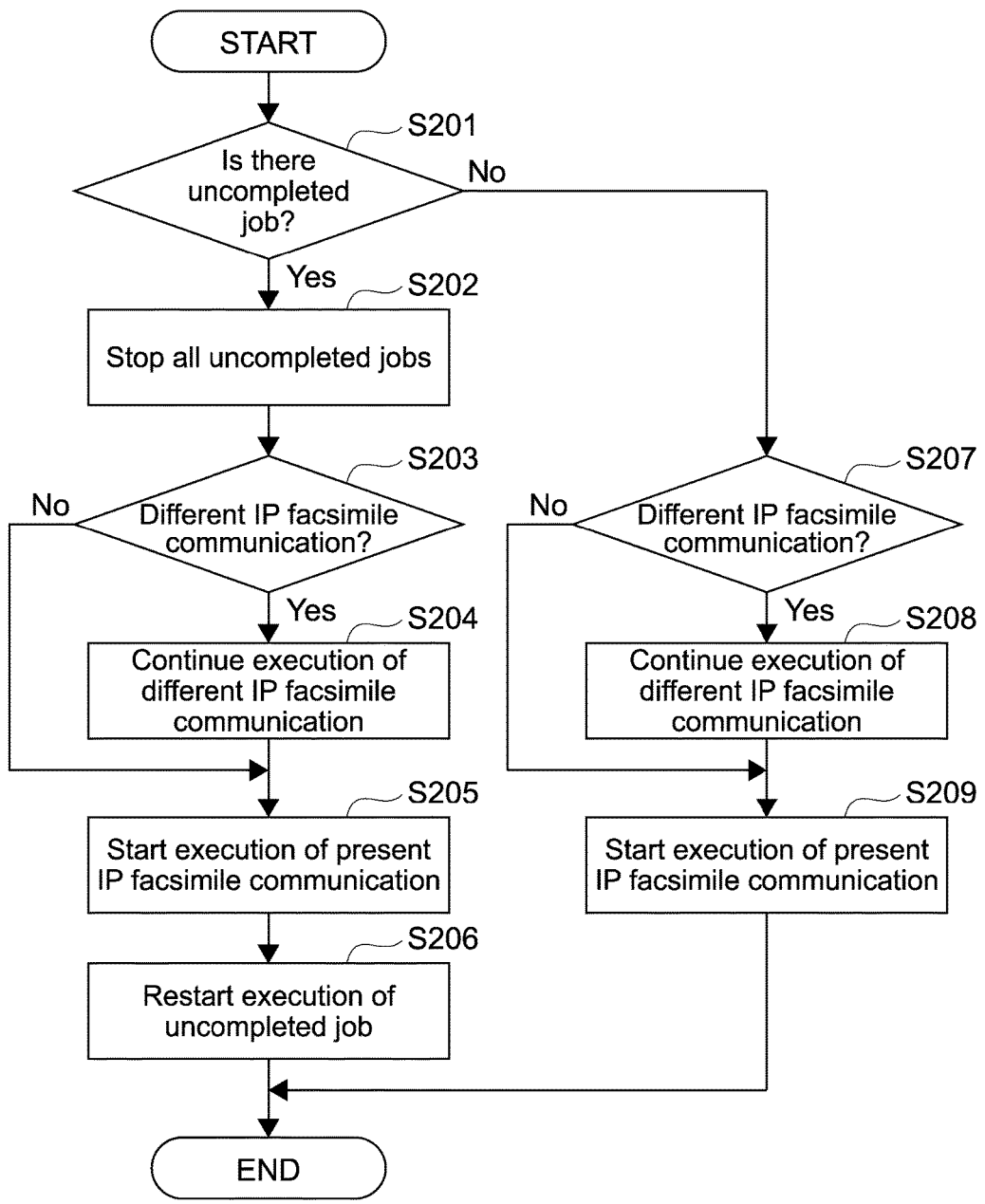
FIG. 5 is a flowchart showing an operation of the information processing apparatus when executing a first mode.

FIG. 5 is a flowchart showing an operation of the information processing apparatus when executing the first mode.

In the case where the facsimile communication unit 112 receives an execution instruction of IP facsimile communication (hereinafter, referred to as the present IP facsimile communication), the job determination unit 113 determines whether or not there is one or more uncompleted jobs (Step S201). In the present disclosure, what is simply called "job" represents a job other than IP facsimile communication, e.g., a print job, an optical character recognition (OCR) job, and the like.

In the case where the job determination unit 113 determines that there is one or more uncompleted jobs (Step S201: Yes), the job execution unit 114 stops all the one or more uncompleted jobs (Step S202). "Stop" of the job represents that a job being executed is aborted and an unstarted job is not started.

In the case where the job execution unit 114 stops all the uncompleted jobs, the IP facsimile communication determination unit 115 determines whether or not an execution instruction of different IP facsimile communication is received before the execution instruction of the present IP facsimile communication (Step S203).

In the case where the IP facsimile communication determination unit 115 determines that an execution instruction of different IP facsimile communication is received before the execution instruction of the present IP facsimile communication (Step S203: Yes), the facsimile communication unit 112 continues execution of the different IP facsimile communication (Step S204). In the case of completing the execution of the different IP facsimile communication, the facsimile communication unit 112 starts execution of the present IP facsimile communication (Step S205).

In the case where the facsimile communication unit 112 completes the execution of the present IP facsimile communication, the job execution unit 114 restarts execution of the one or more uncompleted jobs Step S206).

Meanwhile, in the case where the IP facsimile communication determination unit 115 determines that an execution instruction of different IP facsimile communication is not received before the execution instruction of the present IP facsimile communication (Step S203: No), the facsimile communication unit 112 immediately starts execution of the present IP facsimile communication (Step S205).

Further, in the case where the job determination unit 113 determines that there is no uncompleted job (Step S201: No), the IP facsimile communication determination unit 115 determines whether or not an execution instruction of different IP facsimile communication is received before the execution instruction of the present IP facsimile communication (Step S207).

In the case where the IP facsimile communication determination unit 115 determines that an execution instruction of different IP facsimile communication is received before the execution instruction of the present IP facsimile communication (Step S207: Yes), the facsimile communication unit 112 continues execution of the different IP facsimile communication (Step S208). In the case of completing the execution of the different IP facsimile communication, the facsimile communication unit 112 starts execution of the present IP facsimile communication (Step S209).

Meanwhile, in the case where the IP facsimile communication determination unit 115 determines that an execution instruction of different IP facsimile communication is not received before the execution instruction of the present IP facsimile communication (Step S207: No), the facsimile communication unit 112 immediately starts execution of the present IP facsimile communication (Step S209).

5. OPERATION OF INFORMATION PROCESSING APPARATUS WHEN EXECUTING SECOND MODE

Figure 6:
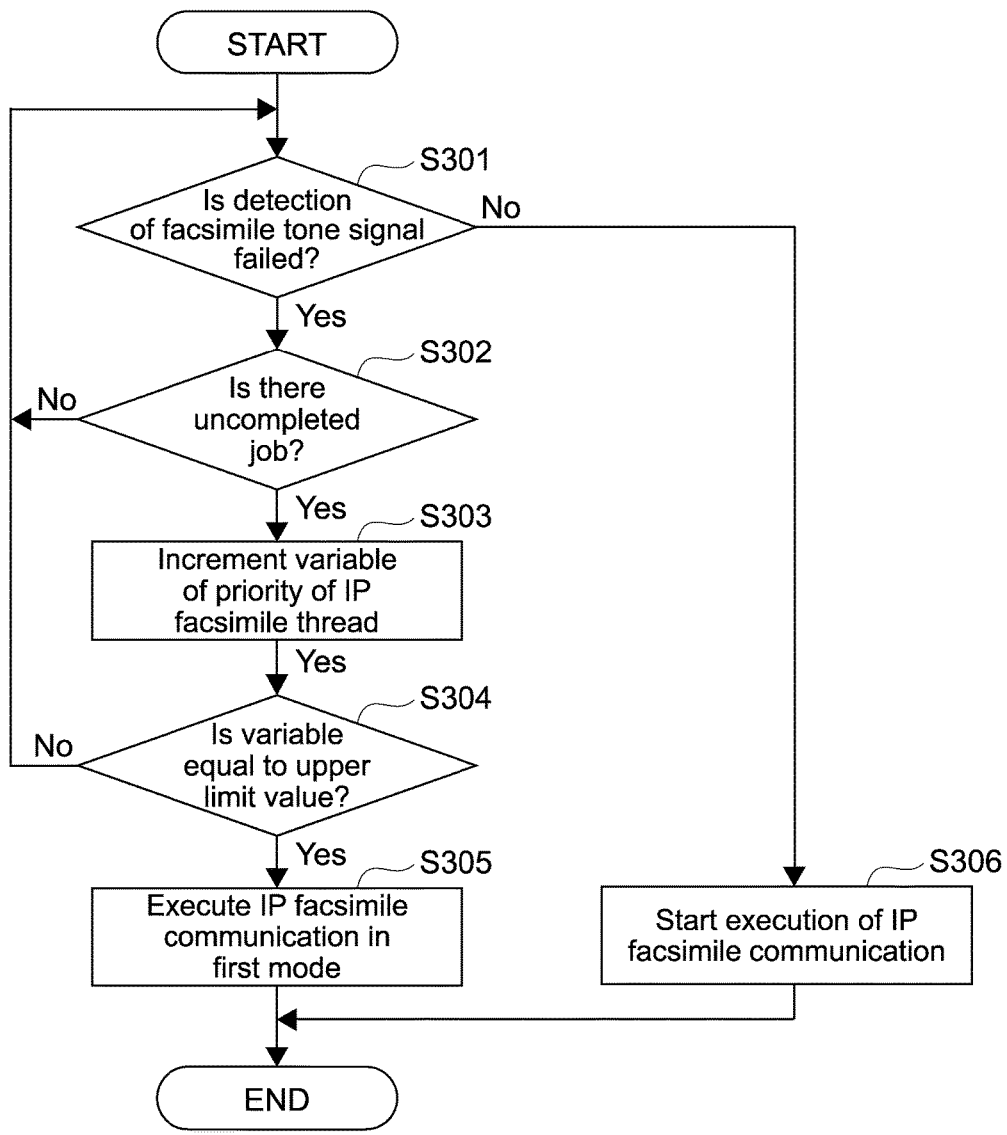
FIG. 6 is a flowchart showing an operation of the information processing apparatus when executing a second mode.

FIG. 6 is a flowchart showing an operation of the information processing apparatus when executing the second mode.

In the case of receiving an execution instruction of IP facsimile communication, the facsimile communication unit 112 starts IP facsimile communication regardless of presence/absence of a job being executed.

The facsimile communication unit 112 attempts to detect a facsimile tone signal for a specific time period (e.g., 15 seconds) (Step S301). Specifically, the job determination unit 113 attempts to detect a CNG signal at the time of IP facsimile reception, and a CED signal at the time of IP facsimile transmission.

In the case where the facsimile communication unit 112 fails to detect a facsimile tone signal (Step S301: Yes), the job determination unit 113 determines whether or not there is one or more uncompleted jobs (jobs other than IP facsimile communication) (Step S302).

In the case where the job determination unit 113 determines that there is one or more uncompleted jobs (Step S302: Yes), the priority updating unit 116 updates (increments) the variable of the priority of the IP facsimile thread, which is stored in the storage 12, to the value larger than the variable by only one (Step S303).

Figure 7:
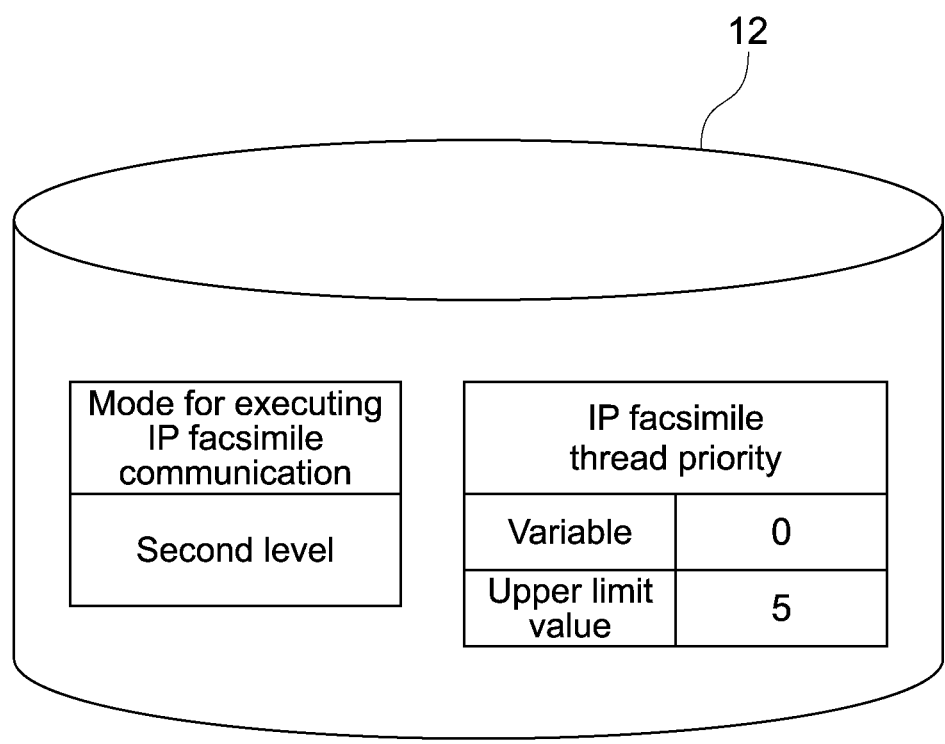
FIG. 7 is a diagram showing an example of a mode of the information processing apparatus for executing IP facsimile communication, and a variable and an upper limit value of an IP facsimile thread priority, which are stored in a storage.

FIG. 7 is a diagram showing an example of a mode of the information processing apparatus for executing IP facsimile communication, and a variable and an upper limit value of an IP facsimile thread priority, which are stored in the storage.

In the case where the second level is stored as a mode for executing IP facsimile communication in the non-volatile memory or HDD of the storage 12, also a variable and an upper limit value of an IP facsimile thread priority are stored in the storage 12. "The IP facsimile thread priority" is a priority of the thread of the CPU for detecting a facsimile tone signal in the second mode. The variable and the upper limit value of the IP facsimile thread priority are values registered in the storage 12 by an operator before shipment of the information processing apparatus 10. For example, the variable and the upper limit value of the IP facsimile thread priority are 0 (initial value) and 5, respectively.

In the case where the priority updating unit 116 increments the variable of the priority of the IP facsimile thread, the mode switching unit 117 determines whether or not the incremented variable is equal to the upper limit value (Step S304). Specifically, the mode switching unit 117 reads the variable and the upper limit value of the priority of the IP facsimile thread, which are stored in the storage 12, and compares them. In the case where the variable of the priority of the IP facsimile thread reaches the upper limit value (Step S304: Yes), the mode switching unit 117 switches the second mode to the first mode. Specifically, the mode switching unit 117 rewrites the level of the mode for the CPU to execute IP facsimile communication, which is stored in the storage 12, to the first level. Then, the information processing apparatus 10 executes IP facsimile communication in the first mode (Step S305). Further, in the case where the variable of the priority of the IP facsimile thread reaches the upper limit value (Step S304: Yes) and a specific condition is satisfied, the priority updating unit 116 resets the variable of the priority of the IP facsimile thread. The specific condition is one of conditions including when execution of IP facsimile communication is started and when IP facsimile communication is completed, in the case where the variable of the priority of the IP facsimile thread reaches the upper limit value.

In the case where the variable of the priority of the IP facsimile thread does not reach the upper limit value (Step S304: No), the processing of the information processing apparatus 10 returns to Step S301.

Meanwhile, in the case where the facsimile communication unit 112 succeeds in detecting a facsimile tone signal (Step S301: No), the facsimile communication unit 112 starts execution of IP facsimile communication (Step S306). Further, in the case where the facsimile communication unit 112 succeeds in detecting a facsimile tone signal (Step S301: No) and a specific condition is satisfied, the priority updating unit 116 resets the variable of the priority of the IP facsimile thread. The specific condition is one of conditions including when execution of IP facsimile communication is started and when IP facsimile communication is completed, in the case where the facsimile communication unit 112 succeeds in detecting a facsimile tone signal.

Further, in the case where the job determination unit 113 determines that there is no uncompleted job (Step S302: No), the processing of the information processing apparatus 10 returns to Step S301. Note that in the case where Step S301 (Step S301: Yes) and Step S302 (Step S302: No) are repeated for a specific time period, i.e., the facsimile communication unit 112 repeatedly fails to detect a facsimile tone even though there is no uncompleted job, the information processing apparatus 10 detects a communication error.

6. CONCLUSION

When executing IP facsimile communication in a network environment connected to a CISCO gateway, an information processing apparatus initially performs SIP connection by an audio medium, and transmits/receives facsimile tone (CNG/CED signal) data that is digital audio data. This is a necessary operation for the CISCO gateway to execute IP facsimile communication according to T.38 as analog G3 facsimile communication via a PSTN line. Also in the case of IP facsimile in not a T.38 method but a deemed audio method, similarly, the information processing apparatus executes audio communication processing on a CNG/CED signal by software processing (soft modem) and detects a facsimile tone. In these two methods, since audio communication processing including facsimile tone detection is executed by software processing, the real time property may be impaired depending on the usage state of a CPU. Therefore, even in the state where the load of the CPU is high, e.g., at the time of executing a job other than IP facsimile such as printer print, it is desired to be capable of executing, in real time, audio processing at the time of detecting a facsimile tone of IP facsimile communication.

In this regard, according to this embodiment, in the case where the CPU has relatively low performance, when accepting an execution instruction of IP facsimile communication (first mode), the information processing apparatus 10 stops an uncompleted job and then preferentially executes IP facsimile communication. Accordingly, it is possible to cause detection of a facsimile tone signal to occupy the CPU. Therefore, even in the state where the load of the CPU is high, it is possible to execute audio data processing of a facsimile tone signal in real time. According to this embodiment, the reliability of IP facsimile communication can be improved even in the case where the CPU has relatively low performance.

Further, according to this embodiment, in the case where the CPU has relatively high performance, the information processing apparatus 10 execute an uncompleted job and IP facsimile communication in parallel, and gradually increases (increments) the variable of the priority of the IP facsimile thread (second mode) in the case of failing to detect a facsimile tone signal. Accordingly, it is possible to execute IP facsimile communication with the minimum usage rate of the CPU.

Further, according to this embodiment, in the case of failing to detect a facsimile tone signal even in the state where the variable of the priority of the IP facsimile thread is increased to the upper limit value, the information processing apparatus 10 switches the second mode to the first mode and executes the first mode. Accordingly, even in the case where another job occupies the CPU and the CPU fails to detect a facsimile tone signal, the CPU is capable of preferentially executing IP facsimile communication by stopping an uncompleted job (first mode). Therefore, even in the state where the load of the CPU is high, it is possible to execute audio data processing of a facsimile tone signal in real time.

7. MODIFIED EXAMPLE

In the above-mentioned embodiment, the first level or the second level that represents the mode for the CPU to execute IP facsimile communication is stored in the storage 12 in advance. Alternatively, the control unit 11 may cause the storage 12 to store the first level or the second level that represents the mode for the CPU to execute IP facsimile communication depending on the performance of the CPU. For example, as the index representing the performance of the CPU, the clock frequency of the CPU can be used. The control unit 11 registers the first level in the storage 12 when determining that the clock frequency of the CPU is less than a specific threshold value, and registers the second level in the storage 12 when determining that the clock frequency of the CPU is not less than the specific threshold value.

According to the present modified example, the information processing apparatus dynamically sets the mode for executing IP facsimile communication depending on the performance of the CPU. Accordingly, since the IP facsimile communication can be executed in the optimal mode depending on the performance of the CPU of the information processing apparatus, it is possible to execute IP facsimile communication with the minimum usage rate of the CPU.

Note that in the case where the second mode is executed and the facsimile communication unit 112 receives a plurality of execution instructions of IP facsimile communication, the variable of the priority corresponding to the IP facsimile thread of each piece of IP facsimile communication may be stored. In this case, the processing shown in FIG. 6 is executed for each piece of IP facsimile communication. Note that in the case where the variable of the priority of any of the plurality of pieces of IP facsimile communication reaches the upper limit value, the information processing apparatus 10 executes the IP facsimile communication in the first mode shown in FIG. 5.

What is claimed is:

1. An information processing apparatus, comprising:
a processor capable of executing IP facsimile communication and a job other than the IP facsimile communication, a facsimile tone signal being transmitted/received as audio data in the IP facsimile communication;
a storage that stores
a first level or a second level, the first level or the second level representing a mode for the processor to execute the IP facsimile communication, and
a variable of an IP facsimile thread priority representing a priority of a thread for detecting the facsimile tone signal in the second mode; and
a control unit that
determines whether the first level or the second level is stored in the storage, selects a first mode when determining that the first level is stored in the storage, and selects a second mode when determining that the second level is stored in the storage,
when receiving an execution instruction of the IP facsimile communication in the first mode, causes the processor to stop an uncompleted job and then preferentially execute the IP facsimile communication, and
when receiving an execution instruction of the IP facsimile communication in the second mode, causes the processor to execute an uncompleted job and the IP facsimile communication in parallel, and
when the control unit fails to detect the facsimile tone signal in the second mode, the control unit
determines whether or not there is the uncompleted job,
increments the variable when determining that there is the uncompleted job, and
resets the variable when completing the IP facsimile communication.

2. The information processing apparatus according to claim 1, wherein
where the control unit receives a plurality of execution instructions of IP facsimile communication, the storage stores the variable corresponding to an IP facsimile thread of each piece of IP facsimile communication.

3. The information processing apparatus according to claim 1, wherein
the storage further stores an upper limit value of the IP facsimile thread priority, and
where the incremented variable reaches the upper limit value, the control unit switches the second mode to the first mode, and causes the processor to execute the first mode.

4. The information processing apparatus according to claim 1, wherein
when receiving an execution instruction of the IP facsimile communication in the first mode, the control unit determines whether or not there is the uncompleted job,
when determining that there is the uncompleted job, stops the uncompleted job and then executes the IP facsimile communication, and
when determining that there is no uncompleted job, starts execution of the IP facsimile communication.

5. The information processing apparatus according to claim 4, wherein
the control unit
determines whether or not an execution instruction of different IP facsimile communication is received before the execution instruction of the IP facsimile communication, and
when determining that the execution instruction of the different IP facsimile communication is received, completes execution of the different IP facsimile communication, and then starts execution of the IP facsimile communication.

6. An information processing apparatus, comprising:
a processor capable of executing IP facsimile communication and a job other than the IP facsimile communication, a facsimile tone signal being transmitted/received as audio data in the IP facsimile communication;
a storage that stores a first level or a second level, the first level or the second level representing a mode for the processor to execute the IP facsimile communication; and a control unit that
  determines whether the first level or the second level is stored in the storage, selects a first mode when determining that the first level is stored in the storage, and selects a second mode when determining that the second level is stored in the storage,
  when receiving an execution instruction of the IP facsimile communication in the first mode, causes the processor to stop an uncompleted job and then preferentially execute the IP facsimile communication, and
  when receiving an execution instruction of the IP facsimile communication in the second mode, causes the processor to execute an uncompleted job and the IP facsimile communication in parallel, wherein
the control unit
  stores the first level in the storage where a clock frequency of the processor is less than a specific threshold value, and
  stores the second level in the storage where the clock frequency of the processor is not less than the specific threshold value.

7. An information processing method executed by an information processing apparatus including a processor capable of executing IP facsimile communication and a job other than the IP facsimile communication, a facsimile tone signal being transmitted/received as audio data in the IP facsimile communication, and a storage that stores a first level or a second level, the first level or the second level representing a mode for the processor to execute the IP facsimile communication, and a variable of an IP facsimile thread priority representing a priority of a thread for detecting the facsimile tone signal in the second mode, the method comprising:
  determining whether the first level or the second level is stored in the storage, selecting a first mode when determining that the first level is stored in the storage, and selecting a second mode when determining that the second level is stored in the storage;
  when receiving an execution instruction of the IP facsimile communication in the first mode, causing the processor to stop an uncompleted job and then preferentially execute the IP facsimile communication; and
  when receiving an execution instruction of the IP facsimile communication in the second mode, causing the processor to execute an uncompleted job and the IP facsimile communication in parallel; and
  when failing to detect the facsimile tone signal in the second mode,
    determining whether or not there is the uncompleted job,
    incrementing the variable when determining that there is the uncompleted job, and
    resetting the variable when completing the IP facsimile communication.

8. The information processing apparatus according to claim 6, wherein
  where the control unit receives a plurality of execution instructions of IP facsimile communication, the storage stores the variable corresponding to an IP facsimile thread of each piece of IP facsimile communication.

9. The information processing apparatus according to claim 6, wherein
  the storage further stores an upper limit value of the IP facsimile thread priority, and
  where the incremented variable reaches the upper limit value, the control unit switches the second mode to the first mode, and causes the processor to execute the first mode.

10. The information processing apparatus according to claim 6, wherein
  when receiving an execution instruction of the IP facsimile communication in the first mode, the control unit determines whether or not there is the uncompleted job,
  when determining that there is the uncompleted job, stops the uncompleted job and then executes the IP facsimile communication, and
  when determining that there is no uncompleted job, starts execution of the IP facsimile communication.

11. The information processing apparatus according to claim 10, wherein
  the control unit
    determines whether or not an execution instruction of different IP facsimile communication is received before the execution instruction of the IP facsimile communication, and
    when determining that the execution instruction of the different IP facsimile communication is received, completes execution of the different IP facsimile communication, and then starts execution of the IP facsimile communication.

12. The information processing method according to claim 7, further comprising:
  where receiving a plurality of execution instructions of IP facsimile communication, in the storage, storing the variable corresponding to an IP facsimile thread of each piece of IP facsimile communication.

13. The information processing method according to claim 7, wherein
  the storage further stores an upper limit value of the IP facsimile thread priority, and
  the method further comprises, where the incremented variable reaches the upper limit value, switching the second mode to the first mode, and causes the processor to execute the first mode.

14. The information processing method according to claim 7, further comprising:
  when receiving an execution instruction of the IP facsimile communication in the first mode,
    determining whether or not there is the uncompleted job,
    when determining that there is the uncompleted job, stopping the uncompleted job and then executing the IP facsimile communication, and
    when determining that there is no uncompleted job, starting execution of the IP facsimile communication.

15. The information processing method according to claim 14, further comprising:
  determining whether or not an execution instruction of different IP facsimile communication is received before the execution instruction of the IP facsimile communication; and
  when determining that the execution instruction of the different IP facsimile communication is received, completing execution of the different IP facsimile communication, and then starts execution of the IP facsimile communication.

* * * * *